Dec. 2, 1969    W. B. McCAIN ET AL    3,481,594
SIGNATURE FEEDING APPARATUS
Filed July 10, 1967    5 Sheets-Sheet 1
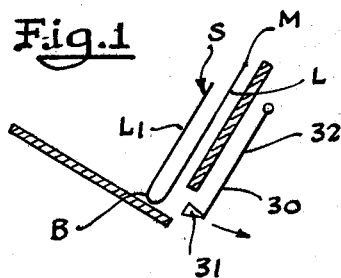
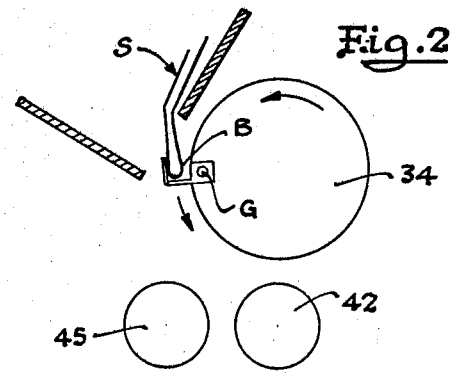
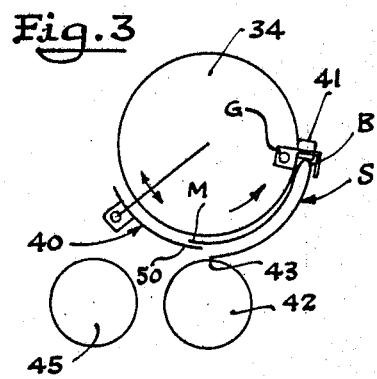
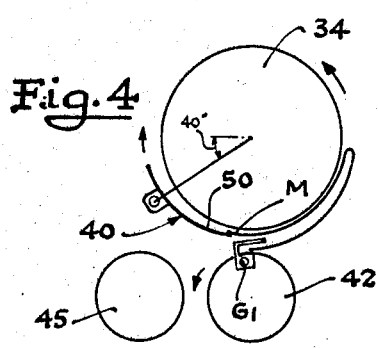
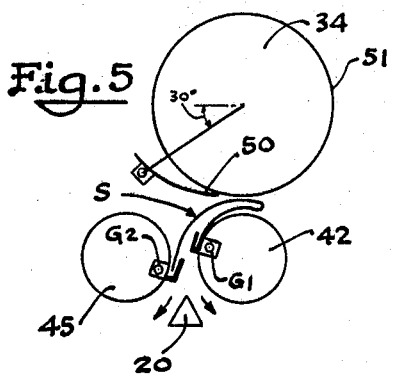
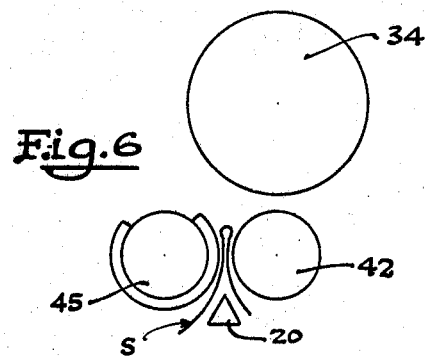
Inventors
William B. McCain
Ronald W. Weller
By Wallace, Kinzer and Dorn
Attorneys Dec. 2, 1969  W. B. McCAIN ETAL  3,481,594
SIGNATURE FEEDING APPARATUS
Filed July 10, 1967  5 Sheets-Sheet 2
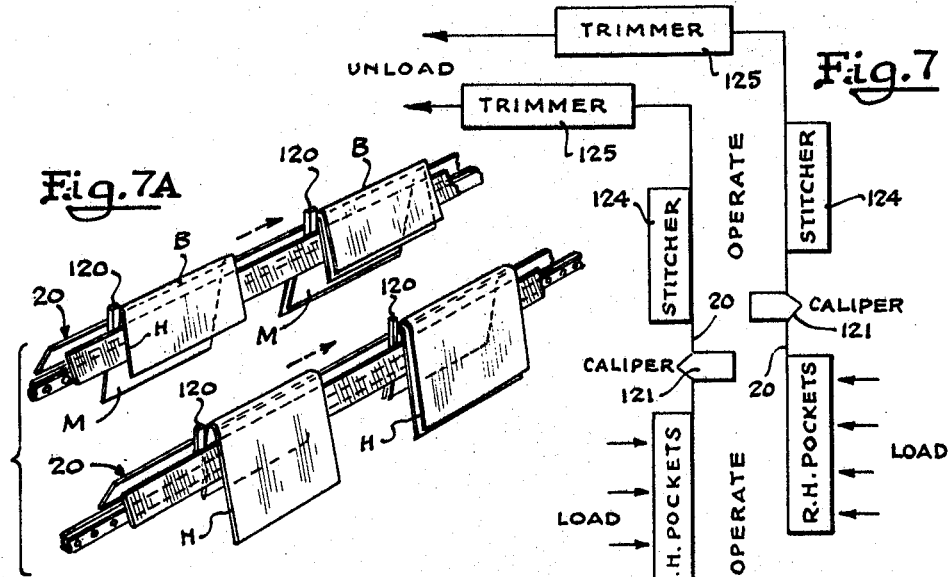
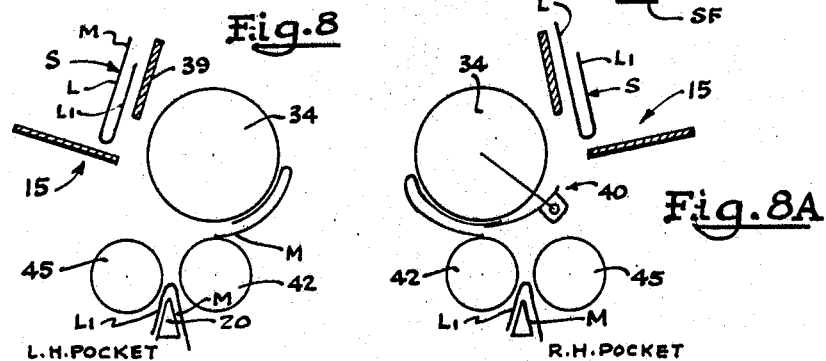
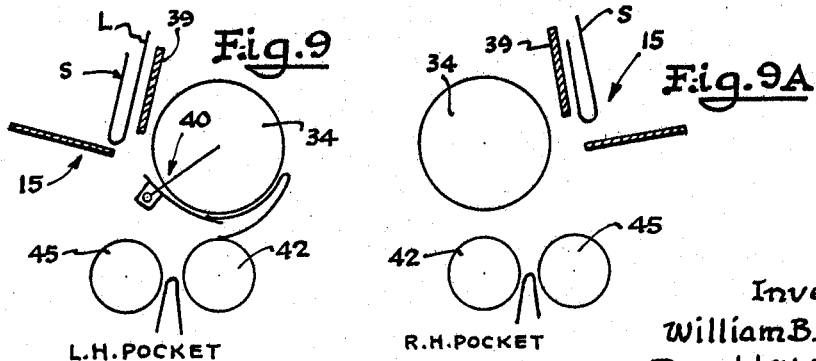
Inventors
William B. McCain
Ronald W. Weller
By Wallace, Kinzer and Dorn
Attorneys Dec. 2, 1969   W. B. McCAIN ETAL   3,481,594
SIGNATURE FEEDING APPARATUS
Filed July 10, 1967   5 Sheets-Sheet 4

Inventors
William B. McCain
Ronald W. Weller
By Wallace, Kinzer and Dorn
Attorneys

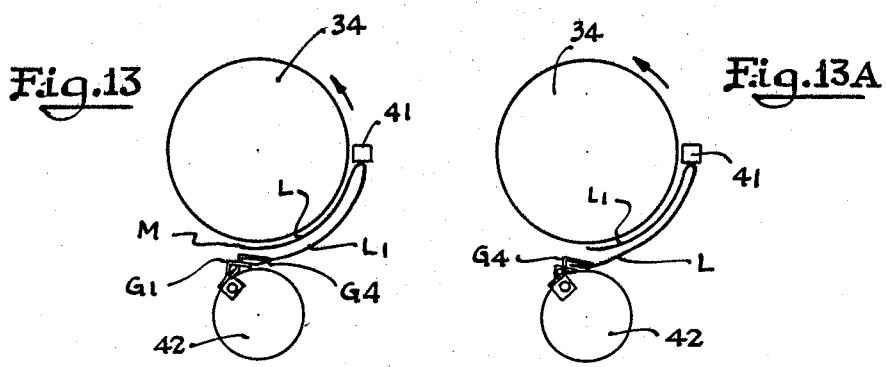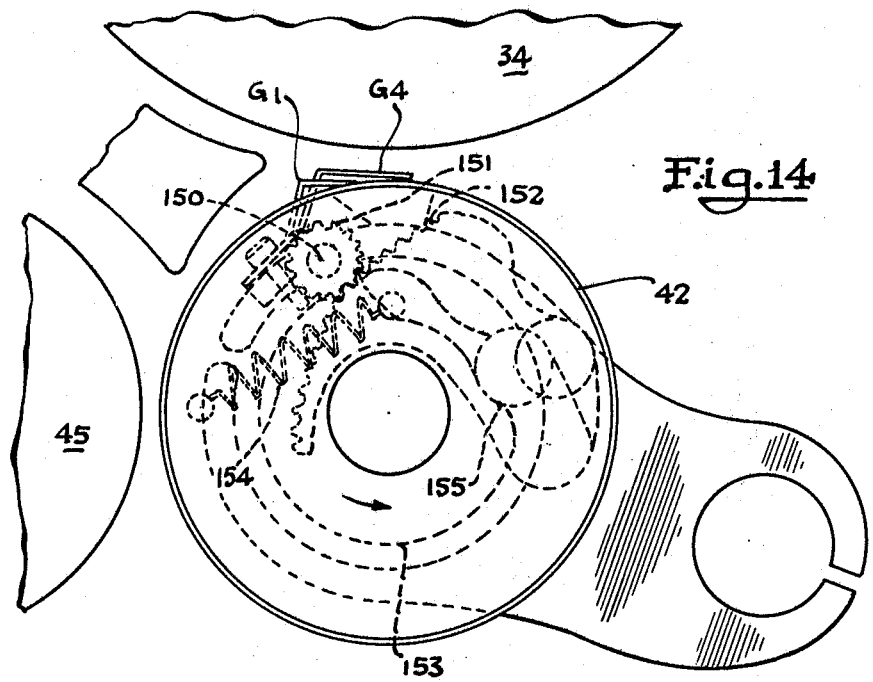

United States Patent Office 3,481,594
Patented Dec. 2, 1969

3,481,594
SIGNATURE FEEDING APPARATUS
William B. McCain, Hinsdale, and Ronald W. Weller, Chicago, Ill., assignors to Chicago Machinery Laboratory, Inc., Chicago, Ill., a corporation of Illinois
Filed July 10, 1967, Ser. No. 652,261
Int. Cl. B65h 39/12
U.S. Cl. 270—54
9 Claims

ABSTRACT OF THE DISCLOSURE

In a signature feeding machine, where signatures having a long leg and a short leg are fed from a stack to a pair of cylinders which spread the legs prior to dropping the signature on a conveyor, the signatures can be fed without regard to the position of the long leg. This is accomplished by supporting the long leg, at its trailing "lap" margin, while the shorter leg is being gripped immediately prior to the spreading operation.

This invention relates to apparatus for feeding signatures.

The present invention is particularly directed to feeding of signatures so folded as to afford a long leg and a short leg with the marginal portion of the longer leg constituting a lap or marginal extension. The lap affords an edge to be gripped by the familiar signature grippers or clamps such as disclosed in FIG. 5 of Patent Re. 25,870.

The present invention is of particular importance to signature feeding machines in which signatures are removed individually from a pile of signatures and deposited on a moving gathering chain or conveyor. Such a signature feeding machine takes the signature from the bottom or front of a stack of signatures, opens the signature and drops the signature on a saddle conveyor, as in Patent Re. 25,870, with the head of the signature in the trailing direction of the direction of feed of the conveyor.

Because the signatures are already printed for collection into books or magazines, the heads of the signatures must all be oriented in the same direction, and likewise the lap marginal extension of the signatures must be uniformly on the same side of the saddle conveyor to assure that the printed matter on the signatures is all oriented in the same manner when the signatures are stitched into a book. Heretofore, signature feeding machines have been limited to predetermined orientation of the laps of the signatures in the stack condition or to the manner of placing stacks in a signature feeding machine in order to achieve the desired, opened orientation of a signature on a conveyor; and accordingly, an object of the invention is to afford increased flexibility in the manner of feeding lap signatures to the desired predetermined orientation on a conveyor.

Heretofore, the steps in feeding lap signatures from a stack to a saddle conveyor by conventional signature feeders, to which the present invention may be applied, are as follows: the lap signature is gripped at the backbone while being removed from a stack by an extracting means; the signature is then transferred from the extracting means by gripping the exposed longer lap marginal extension, then the superimposed short leg is gripped, and the signature is fed downwardly while being opened and dropped onto the saddle conveyor. This latter feature of operation is disclosed in U.S. Patent No. 2,251,943. With such an operation, each of the signatures has to be arranged in a given orientation in a hopper holding the stack to assure that the longer leg is exposed and available for gripping during the transfer operation, and this restricts the flexibility of such signature feeders. Therefore, another object of the invention is to feed signatures to a conveyor by gripping the short leg of the signature while holding the lap leg from being gripped during a transfer operation; in effect, the short leg is exposed for gripping in spite of the fact that the long leg is in a superimposed position.

A further object of the invention is to be able to feed signatures in the same signature feeding machine by gripping either the long leg or the short leg during a transfer operation. More specifically, another object of the invention is to afford an attachment for a conventional signature feeding machine, which feeds signatures by gripping the longer leg, whereby the signature feeding machine is adapted to feed signatures by gripping the shorter leg of the lap signature.

When identical signatures are being fed to transfer conveyors of dual or tandem conveyors, floor space can be conserved by providing a common operating space between the conveyors and by affording loading from right and left hand sides of their respective signature feeding machines. Accordingly, another object of the invention is to feed signatures to the same orientation on each of the conveyor lines while removing signatures from left and right hand hoppers, respectively, on the signature feeding machines by having one signature feeding machine adapted to transfer the signature by gripping a short leg in a transfer operation.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIGS. 1 to 6 illustrate in diagrammatic form sequential operations in removing a lap signature from a pile of signatures and opening the same;

FIG. 7 is a schematic diagram of a pair of signature handling lines;

FIG. 7A illustrates the orientation of signatures on a pair of signature feeding conveyors, arranged as in FIG. 7, but different folio conditions are shown in the two parts of FIG. 7A;

FIGS. 8 and 8A illustrate the feeding of high folio signatures;

FIGS. 9 and 9A illustrate the feeding of low folio signatures;

FIGS. 13 and 13A are diagrammatic views of a modified form of the invention; and FIG. 14 is a side elevation of the modified form of the invention.

Figure 10:
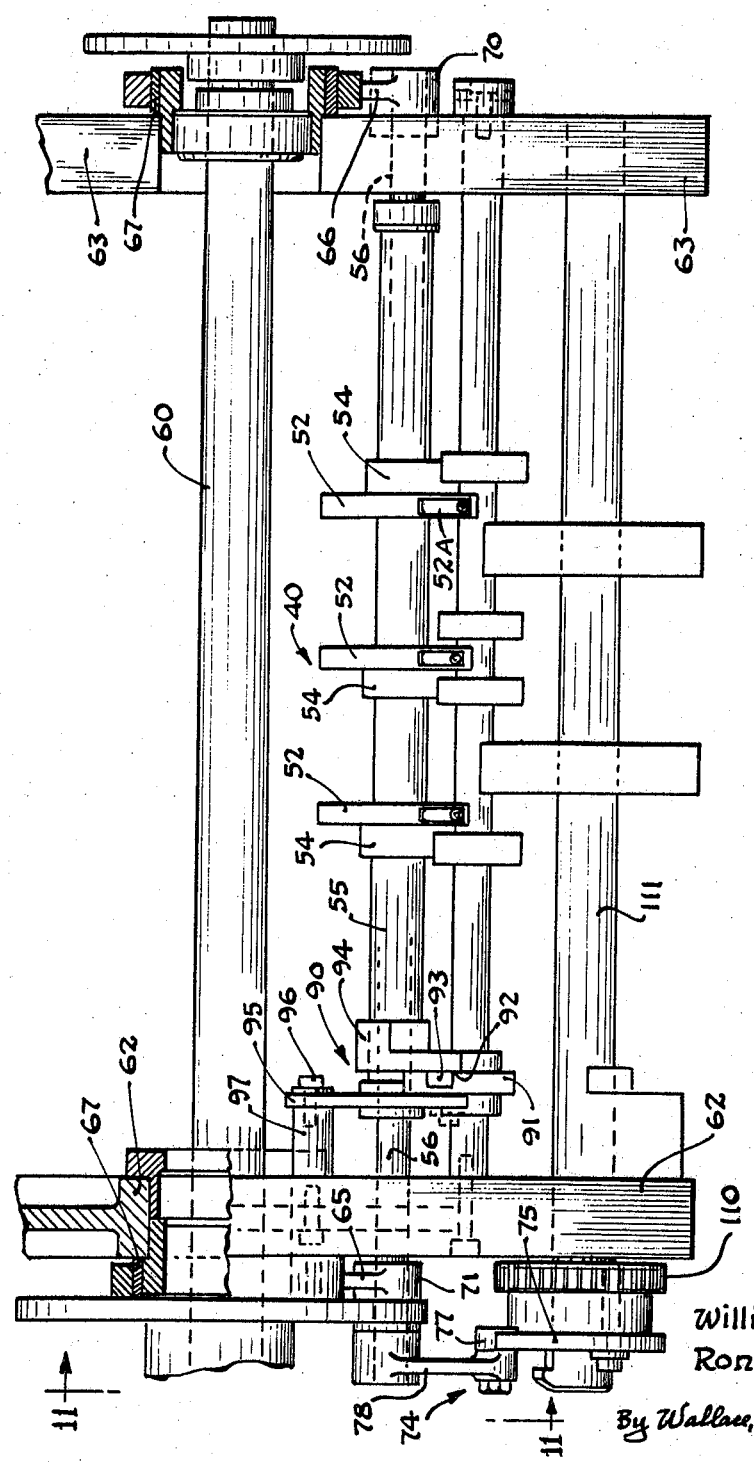
FIG. 10 is an elevational view of the lap guide means and the mechanism for operating the same.

The present invention is particularly directed to the feeding of folded signatures wherein one leg of the signature is longer than the other leg of the signature, thereby constituting what is commonly called a lap signature. Stated in different terms, a lap signature has a marginal lap extension on one of the legs of the signature. Specifically, as shown in FIG. 1, a signature S has a long leg L and a short leg L1 with a folded portion of backbone B. The longer leg exceeds in length the shorter leg L1 by a marginal extension or lap M.

The present invention is of particular use with signature feeding machines which remove a signature from a pile of signatures, open the signature and deposit the same on a saddle type of conveyor.

An important aspect of the present invention is to provide the capability in a signature feeding machine of grasping the shorter leg L1 of the signature to transfer or feed the same in spite of the longer leg being in a superimposed position. Because the grasping of the short leg L1 is the reverse of the conventional manner of transferring a signature by grasping the longer leg L, the present invention may be termed a reverse lap feeder.

The preferred manner of feeding the signature by grasping the non-lap leg L1 is diagrammatically illustrated in FIGS. 1 to 6. As oscillatable sucker finger 30 has a sucker head 31 connected to a vacuum and is oscillated by its arm 32 to extract a signature S from the bottom of the pile and pull the same outwardly into a position to be grasped at the folded backbone B by the familiar gripper G carried by an extracting means, which is preferably in the form of a rotating upper cylinder means 34. The cylinder means 34 continues to rotate in a counterclockwise direction and pulls the signature from the hopper. The signature is forced into close proximity to the periphery of the cylinder means 34 during its travel in a counterclockwise direction, as seen in FIG. 3, toward a fixed stop means or gauge member 41. The gauge 41 limits the counterclockwise travel of the signature S. Simultaneous with arresting movement of the signature S, the grippers G on the cylinder means 34 are opened to release the signature S.

According to the principles of the present invention, the lap margin M is guided, that is, held by a lap guide means 40, FIG. 3, from falling downwardly toward the upper surface of a transfer means, preferably in the form of a transfer cylinder means 42. The marginal extension M is thus held upwardly to prevent its being gripped by a gripper G1 of the transfer cylinder 42 while the signature is being arrested by the stop means 41 from rotation with the cylinder means 34. At this time, the lap guide means 40 is rotating in a clockwise direction to release the marginal extension M for eventual gripping by grippers G2 on a signature opening means, which is preferably in the form of an opening cylinder means 45. As can be seen in FIG. 5, the respective cylinder means 42 and 45 have gripped the respective legs L1 and L of the signature S and are opening the legs while forcibly depositing the signature onto the saddle 20 on the saddle conveyor.

In a conventional signature feeder machine, the short leg L1 of a signature must be disposed forwardly against the vertical hopper wall 39, FIGS. 8 and 9A, in order that the lap marginal extension M may be gripped during transfer of the signature. However, with the reverse lap feeder of the present invention, the disposition of signature may be reversed, as in FIGS. 8A and 9, where the lap leg L is disposed against hopper wall 39. When feeding signatures in the conventional manner (FIG. 8) the marginal extension M on the lap leg L is gripped by the transfer cylinder 42, since the margin M will be a lower, exposed position.

It may be noted that in the conventional or known apparatus the sequence is: first grip the longer leg of the signature; separate the two legs; open the legs by an opening gripper. Under the present invention, the sequence is: separate the legs by "holding" the lap long leg (uppermost) of the signature; grip the lower short leg; open the signature by an opening gripper.

Figure 12:
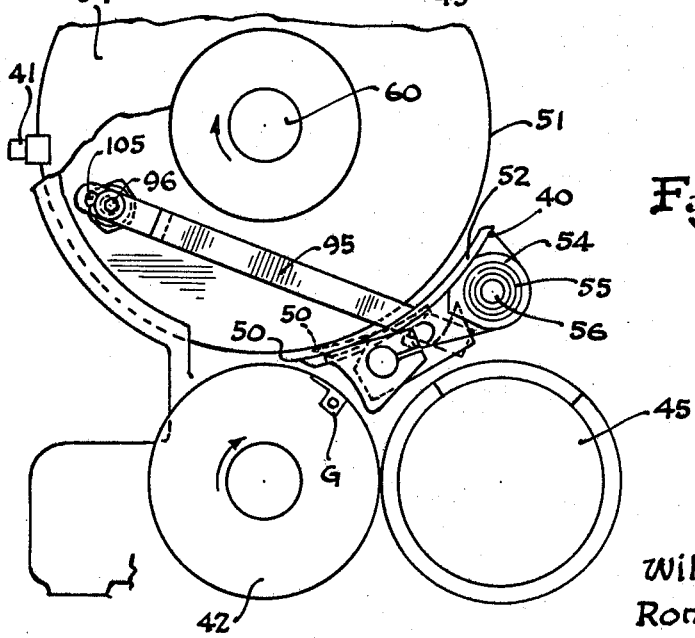
FIG. 12 is a side view of FIG. 10, opposite FIG. 11.

It will be recalled that after the shorter leg L1 is gripped by the gripper G1 of the transfer cylinder 42, as best seen in FIG. 4, the lap guide means 40 is oscillated to release the lap margin M for gripping by the opening cylinder means 45. During reverse movement of the lap guide 40 between the positions of FIGS. 4 and 5, the forward tip 50 of the lap guide may be brought into engagement or close proximity to the peripheral surface 51 of the opening cylinder means 34 to prevent the marginal extension M from moving into the space between the lap guide 40 and the cylinder means 34 during the downward and clockwise movement of marginal lap M. Preferably, as best seen in FIG. 12, the edge 50 of the lap guide means is formed on a slant or inclined surface, and when in the dotted line position shown in FIG. 12, the marginal extension M of the long signature leg L is guided along the inclined surface or edge 50 and downwardly toward the opening cylinder means 45.

As best seen in FIG. 10, the lap guide means 40 is in the form of a plurality of strips 52 concentric to the cylinder means 34, and an apertured bracket or boss 54 is secured thereto for mounting on a tube 55 disposed over an interior shaft 56. An air line or tube 52A, FIG. 10, may be inserted in each guide strip 52, and air is blown therethrough under pressure to separate the legs of the signature in the event of excessive static electricity causing the legs of the signature to cling to one another.

The lap guide supporting shaft 56 extends through arcuate slots in respective side frame members 62 and 63, FIG. 10, of the sheet feeding machine and the ends of the shaft 56 are journaled in supporting arms 65 and 66.

Each of the arms 65 and 66 is pivotally mounted by an upper bearing 67 for pivotal movement about the axis of the cylinder means supporting shaft 60. The lower end of the supporting arm 66 has a boss 70 in which is disposed the rightward end of the lap guide shaft 56. Similarly, the lower end 71 of the left hand supporting arm 65 supports the left hand portion of the lap guide supporting shaft 56.

For the purpose of affording oscillatory movement on the supporting shaft 56 and thereby to the lap guide means 40, a cam means 74 is provided on the left hand side frame 62, FIG. 10. The cam means 74 includes a cam 75 having a lobe 76 for rotating engagement with the cam follower 77 on a cam follower lever 78. Cam follower lever 78 is fixedly secured to the outer end of the lap guide support shaft 56. The cam follower 77 is biased into engagement with the cam 75 through the respective arms 65 and 78 by means of a biasing spring 80, FIG. 11, secured to a spring hanger 81 on the arm 65. The opposite end of the contrile spring 80 is secured by a spring hanger 82 to the side frame 62. For the major dwell portion of the cam 75, the shaft 56 remains stationary with the arcuate guide strips 52 spaced from the periphery of the cylinders 34, as best seen in FIG. 11.

Figure 11:
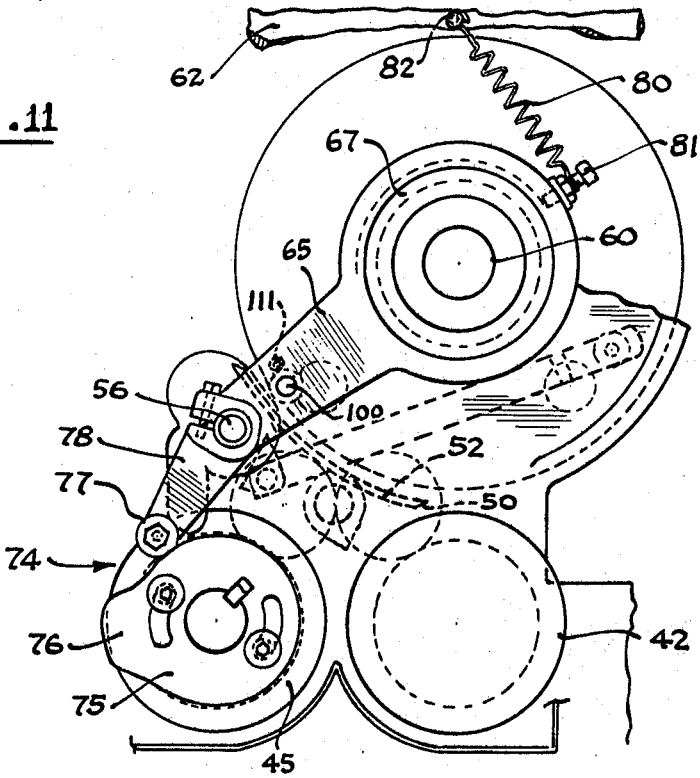
FIG. 11 is a side view taken along the lines 11—11 of FIG. 10 in the direction of the arrows showing the operating mechanism for the lap guide means.

On the other hand, when the cam 75 rotates in a counterclockwise direction, as viewed in FIG. 11, to bring the lobe 76 into engagement with the cam follower 77, the lever arms 78 and 65 will be pivoted in the clockwise direction, as seen in FIG. 11, against the biasing force of the spring 80 to move the shaft 56 and the arcuate guide strips 52 of the lap guide means 40 in a clockwise direction in order that the marginal lap M on the signature S will be free for downward movement for gripping by the opening cylinder means 45.

For the purpose of swinging the leading edge 50 of the respective arcuate strips 52 into close proximity to the periphery of the upper cylinder means 34, additional means in the form of cam means 90, FIG. 10, are provided. The cam means 90 include a fixed cam 91 having a cam track 92 in which moves a cam follower 93 on a cam follower arm 94 secured to the oscillatable tube 55 mounted on the shaft 56. The cam 91 is held in a fixed stationary position by means of a support arm 95 secured by fastener 96 to a post 97 on the side frame 62.

When the shaft 56 is pivoted by the cam means 74 to move the tip 50 of the lap guide means 40 to the position shown in FIG. 5, the shaft 56 pivots about the cylinder shaft 60 carrying the tube 55 therewith. As the tube 55 and its attached cam lever 94 are being pivoted with the shaft 56, the cam follower 93 is forced to partake of an arcuate path causing the tube 55 to rotate on the shaft 56 and thereby the ends 50 of the lap guide strip 52 move into close proximity to the periphery of the cylinder means 34. That is, the tube 55 is also forced to turn because of its attached cam follower arm 94 and cam follower 93 being forced to turn by the cam track 92. Simultaneously with this turning, the lap guide strips 52 are being carried by the shaft 56 in an arcuate path about the shaft 60. As can best be seen in FIG. 12, the cam track 92 is disposed at an angle to the peripheral surface 51 of the cylinder means 34 thereby causing the pivotal movement of the tube 55 and the cam follower means 40 to the position shown in dotted lines in FIG. 12 corresponding to the diagrammatic position for the guide means 40 illustrated in FIG. 5.

A significant aspect of the present invention is that a conventional lap feeder may be employed to feed the signature in the conventional manner or in the reverse manner. When feeding signatures in the conventional manner the lap guide means 40 may be disabled, although not always necessary.

If it is desired or essential to disable the lap guide means 40, the arm 65 is rotated in a counterclockwise direction as seen in FIG. 11, and a locking pin 100 is disposed in a locking aperture 111 in the side frame 62 to hold the cam follower 77 upwardly against the biasing force of the spring 80. Thus, the arcuate guide strips 52 are locked in a remote clockwise position, as seen in FIG. 11, so that the marginal lap extension M is free to drop for gripping by the transfer cylinder 42. Also to assure the spacing of the end portion 50 of the guide strips 52 from the peripheral surface 51 of the cylinder means 34, the cam support arm 95, FIG. 12, is moved downwardly and rightwardly through the length of the slot 105 formed therein, whereupon the fastener 96 is tightened to lock the arm 95 in its now-extended position.

The extension of the arm 95 downwardly and rightwardly as viewed in FIG. 12 will pivot the lap guides 52 about the shaft 56 to have the end portions 50 permanently spaced from the periphery of the cylinder 34. Thus, the signatures will be free to pass between the marginal lap guide means 40 and the periphery 51 of the cylinder means 34. It is also necessary to unclamp the gear 110, FIG. 10, and rotate the opening cylinder shaft 111 to re-time the operation of the opening cylinder for gripping the short leg L1 instead of the long leg.

To enable the lap guide means 40 to be effective, the cam support arm 95 is moved through the length of the slot 105 and the fastener 96 is tightened. The locking pin 100 is removed, permitting the cam follower 77 to follow the cam 75. The gear 110 is unclamped and the cylinder shaft 111 is turned to afford the timing to grip the long leg L of the signature.

The ability to feed signatures by grasping the short leg L1 while holding the marginal lap extension M with a lap guide means 40 is of particular importance when feeding identical signatures to the same orientation in tandem or dual lines, as shown in FIG. 7. It is to be noted in FIG. 7 that the left-hand signature feeder SF is loaded from the left and that the right-hand signature feeder is loaded with signatures from the right side. Thus, the duel feeding and stitching lines may be placed closely adjacent to one another with a common operating space therebetween which space is designated "operate" in FIG. 7, and still orient the signatures in the identical manner on the saddle conveyor 20.

Under the prior art practice, when it is desired to operate dual lines for feeding signatures and stitching signatures in identical orientations over two separate lines, it was necessary to have the signature feeders both of the same orientation, that is, either both lines of signature feeders had to have left hand hoppers, or both lines had to have right hand hoppers.

However, as illustrated in FIGS. 8, 8A, 9 and 9A, it is possible with the present invention to feed either low folio signatures or high folio signatures and orient the signatures in the predetermined condition in both lines. The upper portion of FIG. 7A, shows the signatures being moved along the saddle conveyor 20 by conveyor fingers 120 with a second signature being deposited on the first signature. As seen in the lower portion of FIG. 7A, the feeding of high folio signatures, FIGS. 8 and 8A, results in the marginal extensions M being on the right hand side of the saddle 20. FIGS. 9 and 9A on the other hand illustrate the feeding of low folio signatures wherein the marginal extension M is on the left hand side of the saddle 20, as is also shown in the upper part of FIG. 7A. It will be appreciated from FIG. 7A that the head portion H of each signature must be abutted by the conveying pin 120 as well as having the marginal lap extension on the same side of the saddle conveyor 20.

As seen in FIGS. 8 and 8A, each of the signature feeders deposit signatures with the long leg on the right hand side. Conversely, both the left hand pocket feeder and right hand pocket feeder of FIGS. 9 and 9A deposit signatures with the heads oriented rearwardly for engagement by a transfer conveyor pin 120 and have their longer legs on the left hand side. To achieve these results, a reverse lap feeder is employed in FIGS. 8A and 9 with the hereinbefore described lap guide means 40 effective to hold the lap marginal extension M while short leg L1 is being gripped by the transfer cylinder 42.

The use of left and right hand pocket feeders for feeding the same signatures to the same orientation over dual operating lines results in the saving of considerable floor space designated as "operate" in FIG. 7. Thus a common space can be utilized for the operators who check the feeding of the signatures onto the saddles 20 and through the further operations. As seen in FIG. 7, the typical stitching line includes a signature feeding station wherein a plurality of signature feeding machines deposit signatures one upon another in a superimposed condition. The superimposed signatures are moved along the saddle conveyor 20 to a caliper station 121 where the thickness of the superimposed signatures is gauged. If the signatures are of the correct thickness, signatures are stitched or stapled at a stitcher station 124. After the signatures are secured together by staples or the like, the now formed books are then moved to a trimmer station 125 wherein the marginal lap extensions M are severed leaving the book in its trimmed condition.

As an aid to further understanding of the foregoing, a brief description of the operation of the reverse lap feeder is illustrated hereinafter.

As seen in FIG. 1, the sucker head 31 engages a signature near the backbone B and pulls the same from the hopper into the bight of a gripper G on the continually rotating cylinder means 34. Assuming it is desired to feed the signatures S by gripping the short leg L1, the lap guide means 40 is enabled to hold the marginal portion M of the signature S above and away from the gripper G1 on a transfer cylinder 42, as best shown in FIGS. 3 and 4. The backbone B is brought into engagement with the stop means 41 and the grippers on the upper cylinder means 34 are opened. The shorter leg L1 drops downwardly and is being gripped by the gripper G1 on the cylinder 42. The guide means 40 is simultaneously being pivoted to an inoperative position to release the marginal lap M for gripping by the gripper G2 on the opening cylinder 45.

More particularly, to move the guide means 40 to release the lap margin M the cam 75 is rotated into engagement with the cam follower lobe 77 and has pivoted the shaft supporting arms 65 and 78 in a clockwise direction, as seen in FIG. 11, against the biasing force of the spring 80.

The shaft 56 carries a tubular member 55 on which are mounted the arcuate strips 52 of the lap guide means 40. Thus, the lap guide means 40 is being carried with the shaft in a clockwise direction, as seen in FIG. 11, to release the marginal lap M of the signature S for downward movement.

Simultaneously, with the reversal of the lap guide means 40, the cam follower 93 on a cam follower arm 94 is rotating the tubular member 55 to cause the end portions 50 of the lap guide means 40 to move close to the peripheral surface of the cylinder means 34. Thus, it will be seen that the lap guide means 40 has a compound motion of moving to an inoperative position to release the marginal lap M and moving the ends 50 of the guide strips 52 into the circumferential plane of the cylinder means 34. At this latter position the inclined surfaces of the edge portions 50 serve to cam the marginal lap M downwardly to the now-open grippers G2 on the cylinder 45. The opening cylinder 45 is preferably a mutilated type of wheel having a rubber facing thereon. Vacuum heads may, if desired, be provided on both sides of the cylinders 42 and 45 to assist in opening the signatures S as they are being forced between the bight of the respective cylinders 42 and 45 and onto the saddle conveyor means 20.

It will be appreciated that the signature feeding operation is a high speed operation for handling rapidly large numbers of signatures and moving them accurately to a registered position on the saddle conveyor means 20 for stitching at the stitching station 124.

When it is desired to use the same signature feeding machine in the conventional manner for the gripping of the marginal extensions M by the transfer cylinder 42, the lap guide means 40 may be disabled from oscillation and latched in position spaced away from the cylinder means 34. To disable oscillation of the lap guide means 40, the pin 100 is inserted through the arm and into the socket opening 100 in the side frame thereby securing the arm 65 and the cam follower 77 in an outward position free of the operation of the cam 75. The locking of the arm 65 in this inoperative, clockwise position, as seen in FIG. 11, holds the end portions 50 of the lap guide strips 52 clockwise of the marginal extension M when the backbone B of the signature is engaging the register stop 41. Thus, the end portion of the long leg L of the signature S is free to drop downwardly and to be gripped by the gripper G on the transfer cylinder 42. The turning of the transfer cylinder 42 thus brings down the short leg L1 into position to be gripped by the gripper G on the opening cylinder 45. The larger, diameter portion of the opening cylinder 45 then cooperates with the cylinder means 42 to forcibly drive the now open signature into the saddle conveyor means 20. Optionally, the signature feeder has vacuum heads on either side of the respective signature legs L and L1 to assist in opening the signature as it is being forced on the saddle conveyor means 20.

Advantageously, to assure that both legs of a signature are effectively withdrawn from the cylinder 34, when the lap guide 40 is in its releasing position, the transfer cylinder 42 may be equipped with a second gripper means G4, FIGS. 13, 13A and 14, displaced axially from the gripper G1 on the transfer cylinder. The auxiliary gripper G4 thus assures in a positive fashion that the upper leg of the signature will not become jammed in or on the lap guide, especially when the lap feed is in the reverse sense of the present disclosure, FIG. 13, although gripper G4 may be utilized even with conventional positioning of the signature, FIG. 13A. The auxiliary gripper G4 is thus of a length to grip, in an overlapping fashion, both the short leg and the long leg of a signature, FIG. 13.

FIG. 14 is a detail view of the operating means for the grippers G1 and G4, and is typical of the operation of all the grippers herein identified. Each gripper blade G1 and G4 is clamped to an operating shaft as 150 having a pinion gear 151 thereon. A segment gear 152 is meshed with the pinion and travels with the transfer cylinder 42. Each segment gear as 152 is oscillated about a pivot pin under control of a stationary cam 153 and a spring 154. Each gripper has its own separate gear and cam-spring control, and each segment gear has a cam follower as 155, as exemplified in Patent Nos. 2,251,943 (FIG. 3) and Re. 25,870 (FIG. 5); and likewise the control cams are so configured that as the transfer cylinder 42 rotates, the grippers G1 and G4 are opened and closed in the proper time sequence. Thus, gripper G1, FIG. 13, will be opened, closed and opened in the proper timed relationship to first grip, and then released to the saddle 20, the short leg of the signature, FIGS. 4–6 (reverse lap feed) or the long, lap leg, FIGS. 8 and 9A (conventional lap feed) as the case may be. Similarly, gripper G4, FIG. 13A, will be opened and then closed to overlap both legs (regardless of whether the feed is reverse or conventional), but gripper G4 must be re-opened in time to enable gripper G2, FIG. 5, to perform its function as above described.

It should be emphasized that grippers as G1 and G2, together with the lap guide 40, are located at approximately the center of a book or signature; whereas gripper means G4 is located near the head of the signature. Thus, while lap guide 40 is supporting the free end of the long leg and gripper G1 is gripping the short leg L1, gripper G4 starts to close on both legs at the head of the signature; and when gripper G4 is closed, lap guide 40 is in its releasing position.

As noted, the operation of the grippers is based on a known structure and a known principle; but so far as we are aware it is new to utilize two grippers, FIGS. 13, 13A and 14 at the instant of withdrawing a signature from a cylinder as 34 incidental to transfer and opening of the signature, whereby there is assurance that indeed both legs of the signature will be withdrawn from cylinder 34 in a positive fashion.

From the foregoing, it will be seen that flexibility of a signature feeder for lap signatures is increased by its ability for grasping either the long leg or by grasping the short leg of a lap signature.

Hence, while preferred embodiments of the invention have been described and illustrated, it is to be understood that they are capable of variation and modification.

We claim:

1. In a signature feeding machine for feeding lap signatures from a stack to a saddle conveyor and for depositing lap signatures in a predetermined orientation, said lap signatures being folded along a backbone and having a long leg and a short leg, said long leg having a marginal lap, extracting means for extracting a signature from said stack while gripping the folded backbone thereof and for moving said signature to a transfer position, transfer means for gripping a leg of said signature when said signature is at said transfer position, lap guide means for holding said lap from being gripped by said transfer means, means to move said lap guide means to release said lap, and signature gripping means for gripping said lap of said signature while said shorter leg of said signature is gripped by said transfer means.

2. The signature feeding apparatus of claim 1 wherein said extracting means includes a rotary member having means for gripping the backbone of said signature and wherein said transfer means is a rotary member having gripper means thereon.

3. The signature feeding apparatus of claim 2 wherein said lap guide means has a portion adapted to be positioned adjacent the peripheral surface of the first-named rotary member to prevent the lap from being located between the first-named rotary member and the lap guide means as said lap is moving to be gripped by said signature gripping means.

4. The signature feeding apparatus of claim 2 wherein said lap guide means is normally spaced from said first-named rotary member to permit a signature to pass between said first-named rotary member and said lap guide means, and stop means for arresting said signature in a transfer position with the shorter legs having passed beyond said lap guide means and with said lap between said first-named rotary member and said lap guide means.

5. The signature feeding apparatus of claim 1 including means for disabling said lap guide means.

6. The signature feeding apparatus of claim 1 wherein said lap guide means is equipped with an air tube.

7. The signature feeding apparatus of claim 1 wherein the transfer means includes a gripper for gripping both legs of the signature.

8. In a signature feeding machine for feeding lap signatures from a stack, extracting means including a vacuum sucker and a rotary extractor having a peripheral surface and having gripper means to extract a signature from said stack while gripping the folded backbone thereof, said extractor being rotatable about an axis for carrying said signatures to a transfer position, a rotary transfer member having an axis located beneath said first-mentioned axis and having gripping means for gripping a leg of said signature when said signature is at said transfer position, lap guide means mounted for oscillating movement relative to said first-mentioned axis and having a portion adjacent the peripheral surface of said extractor, said lap guide means being adapted to hold said lap from being gripped by said transfer member, means to move said lap guide means in a direction away from said extractor to release said lap, and an opening means adjacent said transfer member for gripping said lap when released by said lap guide means.

9. The signature feeding apparatus of claim 8 wherein said lap guide means is equipped with means to apply a stream of forced air between the legs of a signature.

References Cited

UNITED STATES PATENTS

| | | | |
|---|---|---|---|
| 2,507,281 | 5/1950 | Spisak | 270—54 |
| 2,817,513 | 12/1957 | Bell et al. | 270—54 |
| 2,845,264 | 7/1958 | Faeber | 270—54 |
| 3,199,862 | 8/1965 | Müller | 270—54 |

LAWRENCE CHARLES, Primary Examiner